US008447710B1

(12) United States Patent
Das (10) Patent No.: US 8,447,710 B1
(45) Date of Patent: May 21, 2013

(54) METHOD AND SYSTEM FOR REDUCING LINKS IN A BAYESIAN NETWORK

(75) Inventor: Sreerupa Das, Oviedo, FL (US)

(73) Assignee: Lockheed Martin Corporation, Orlando, FL (US)

( * ) Notice: Subject to any disclaimer, the term of this patent is extended or adjusted under 35 U.S.C. 154(b) by 379 days.

(21) Appl. No.: 12/848,485

(22) Filed: Aug. 2, 2010

(51) Int. Cl.
*G06F 17/00* (2006.01)

(52) U.S. Cl.
USPC .......................................................... 706/14

(58) Field of Classification Search
None
See application file for complete search history.

(56) References Cited

U.S. PATENT DOCUMENTS 6,973,459 B1* 12/2005 Yarmus ......................... 707/778
2005/0028033 A1* 2/2005 Kipersztok et al. ............. 714/27

OTHER PUBLICATIONS

Wang, "Using Sensitivity Analysis to Validate Bayesian Networks for Airplane Subsystem Diagnosis", IEEE, Aerospace Conference, Jul. 2006, pp. 1-10.*
Mengshoel, Wilkins, Roth, "Controlled Generation of Hard and Easy Bayesian Networks: Impact on Maximal Clique Size in Tree Clustering", Journal Artificial Intelligence archive, vol. 170, Issue 16-17, Nov. 2006, pp. 1137-1174.*
Poll, Patterson-Hine, Camisa, Nishikawa, Spirkovska, "Evaluation, Selection, and Application of Model-Based Diagnosis Tools and Approaches", AIAA Infotech@Aerospace 2007 Conference and Exhibit, May 2007, pp. 1-25.*
Nieuwenhuis, Oliveras, Solving SAT and SAT Modulo Theories: from an Abstract Davis-Putnam-Logemann-Loveland Procedure to DPLL (T), Journal of the ACM (JACM) JACM Homepage archive, vol. 53, Issue 6, Nov. 2006, pp. 937-977.*

Cosgriff, Pat et al., "Intelligent Diagnostic Reasoning System Deployment Process and Results," Proceedings of the IEEE AUTOTESTCON 2008, Sep. 2008, Salt Lake City, UT, pp. 154-158.
Mooney, Raymond J., CS 343: Artificial Intelligence Bayesian Networks (PowerPoint presentation), University of Texas at Austin, downloaded Apr. 2010.
No Author, "A. Introduction to Bayes Nets," Tutorial on Bayesian Networks with Netica, 2010, Norsys Software Corp., http://www.norsys.com/tutorials/netica, originally downloaded on Apr. 21, 2010.
No Author, "Directed Acyclic Graph," Wikipedia, http://en.wikipedia.org/w/index_php?title=Directed_acyclic_graph&printable=yes, printed Apr. 30, 2010.
No Author, "Bayesian Networks," PR-OWL: A Bayesian Extension to the OWL Ontology Language, http://www.pr-owl.org/basics/bn.php, printed Apr. 30, 2010.
Polanska, Joanna et al., Node Assignment Problem in Bayesian Networks, International Journal of Applied Mathematics and Computer Science, 2006, vol. 16, No. 2, pp. 233-240.

* cited by examiner

*Primary Examiner* — Kakali Chaki
*Assistant Examiner* — Walter Hanchak
(74) *Attorney, Agent, or Firm* — Withrow & Terranova, PLLC (57) ABSTRACT

A method and system for reducing a number of links in a Bayesian network. A first modified Bayesian network based on a primary Bayesian network that has a plurality of links is generated, wherein the first modified Bayesian network does not include a first subset of the plurality of links. A second modified Bayesian network based on the primary Bayesian network is generated, wherein the second modified Bayesian network does not include a second subset of the plurality of links. The first modified Bayesian network and the second modified Bayesian network are validated using a first data set to generate a first validation result and a second validation result. The primary Bayesian network is substituted with the first modified Bayesian network or the second modified Bayesian network based on the first validation result and the second validation result.

20 Claims, 5 Drawing Sheets

METHOD AND SYSTEM FOR REDUCING LINKS IN A BAYESIAN NETWORK

FIELD OF THE DISCLOSURE

The technology of the disclosure relates to Bayesian networks, and in particular to reducing the number of links in a Bayesian network while maintaining inferential accuracy.

BACKGROUND

A Bayesian network is a model that represents variables and conditional interdependencies between variables. In a Bayesian network variables are represented as nodes, and nodes may be connected to one another by one or more links. A link indicates a relationship between two nodes. Nodes typically have corresponding conditional probability tables that are used to determine the probability of a state of a node given the state of other nodes to which the node is connected. One common use of a Bayesian network is to diagnose problems, such as diseases.

In operation, a Bayesian network typically grows over time. New nodes may be added, and/or new links between nodes may be established as new relationships between nodes are discovered. Unfortunately, as a Bayesian network grows, the processing associated with determining probabilities increases exponentially. For example, if a child node has m parent nodes, then the probability function for the child node is represented by a table of $2^m$ entries, one entry for each of the $2^m$ possible combinations of its parent nodes being true or false. This exponential increase results in increased processing time associated with inference operations performed by the Bayesian network during operation. The increased processing time may be unacceptable under normal operating conditions.

Accordingly, there is a need for a mechanism for reducing the number of links between nodes in a Bayesian network without negatively impacting inferential accuracy of the network.

SUMMARY

Embodiments disclosed herein relate to methods and systems for reducing the number of links in a Bayesian network without negatively impacting the accuracy of inference operations performed by the Bayesian network. In one embodiment, the links of a primary Bayesian network are analyzed. Each of the links has a corresponding zero or more evidential observations that identify a conditional dependency between two nodes connected by the link. A group of prunable links is identified based on the total number of evidential observations associated with each prunable link. For example, a threshold quantity may be defined and each link having a total number of evidential observations that is fewer than the threshold quantity may be identified as a prunable link.

A first subset of the prunable links is identified. A first modified Bayesian network is generated based on the primary Bayesian network wherein the first modified Bayesian network does not include the first subset of the prunable links. A second subset of the prunable links that is different from the first subset of the prunable links is also identified, and a second modified Bayesian network is generated based on the primary Bayesian network wherein the second modified Bayesian network does not include the second subset of the prunable links. The first modified Bayesian network is validated using a validation data set to generate a first validation result. The second modified Bayesian network is validated using the validation data set to generate a second validation result. The first validation result and the second validation result are compared, and the primary Bayesian network is substituted with the first modified Bayesian network or the second modified Bayesian network based on the first validation result and the second validation result.

In one embodiment, a plurality of modified Bayesian networks is generated from the primary Bayesian network, wherein each of the modified Bayesian networks has a different subset of prunable links pruned from the modified Bayesian network compared to each of the other modified Bayesian networks. Each of the plurality of modified Bayesian networks is validated with the validation data set and the one of the plurality of modified Bayesian networks that has the best validation result replaces the primary Bayesian network. In this manner, multiple modified Bayesian networks may be generated and validated to determine which of the multiple modified Bayesian networks performs best given the validation data set.

In one embodiment, the process may be run on a periodic basis to ensure the primary Bayesian network does not accumulate additional links that have few or no corresponding evidential observations.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein relate to methods and systems for reducing the number of links in a Bayesian network. The growth of a dynamic Bayesian network which establishes new nodes and links based on newly discovered evidential observations is controlled in part by repeatedly pruning links between nodes in the Bayesian network that have insufficient evidential observations to support such links.

While embodiments disclosed herein have applicability in any Bayesian network, an exemplary Bayesian network that models the relationship between aircraft components and diagnostic tests used to test such components will be used herein for purposes of describing and illustrating such embodiments.

The military spends a significant amount of time and money diagnosing failures that occur in complex equipment such as aircraft. When an aircraft develops a problem, in order to maintain aircraft readiness, a technician typically cannot take the time to isolate a particular component that is responsible for the problem. Instead, the technician replaces a complete assembly that includes the failed component so that the aircraft can be ready for flight as soon as possible. The failed assembly includes the failed component as well as other good components that have not failed. The failed assembly is later diagnosed in order to isolate the failed component from the good components. The ability of the test equipment to unequivocally isolate a failure to a single component is frequently limited by the design of the assembly being diagnosed. Test programs may "call out," or identify, multiple components, only one of which may be the faulty component that was responsible for the assembly failure. Unfortunately, it is time consuming to test multiple components in order to determine a single faulty component, and this process also ties up many good components while the faulty component is being isolated.

Over a period of time, technicians gain experience determining which components may be faulty based on the results of diagnostic tests. One way to leverage this experience for use by newer technicians, and to reaffirm an experienced technician's diagnosis, is to record the relationships between components and diagnostic tests such that the probability that a particular component is faulty based on the results of one or more diagnostic tests can be inferred. One mechanism for providing such inferences is a Bayesian network that models the components, the diagnostic tests, and the relationships between the two.

Figure 1:
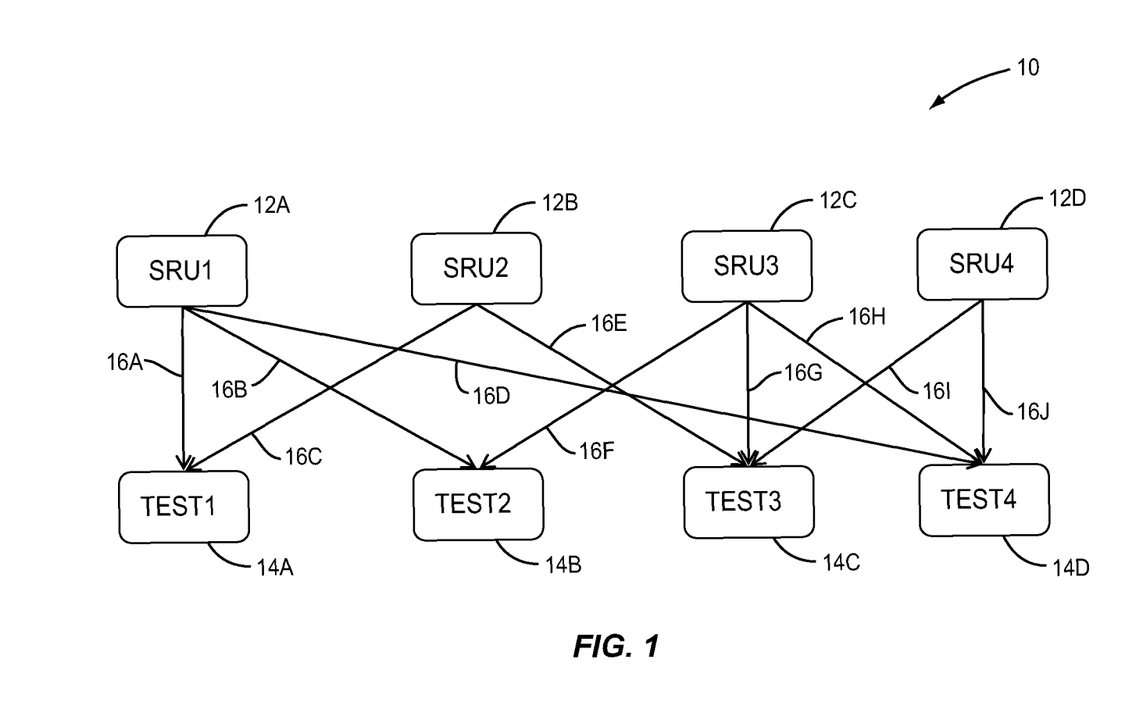
FIG. 1 illustrates a portion of an exemplary Bayesian network that models the relationship between components and diagnostic tests, according to one embodiment.

FIG. 1 illustrates a portion of an exemplary Bayesian network 10 that models the relationship between components and diagnostic tests, according to one embodiment. The Bayesian network 10 includes a plurality of nodes 12 and 14, including shop replaceable unit (SRU) nodes 12A-12D and test nodes 14A-14D. SRU nodes 12A-12D will be referred to generally herein as SRU node 12 or SRU nodes 12. Test nodes 14A-14D will be referred to generally herein as test node 14 or test nodes 14. The exemplary Bayesian network 10 models the relationships between components and sub-assemblies, and diagnostic tests used to test the components and sub-assemblies. Components and sub-assemblies will be referred to herein as SRUs. While not pertinent to the embodiments disclosed herein, for purposes of explanation, an assembly, referred to sometimes as a line replaceable unit (LRU), is made up of multiple SRUs.

Links 16A-16J indicate relationships between SRU nodes 12 and test nodes 14 that are established based on a technician's experience, or based on evidential observations that one or more diagnostic test results corresponds to the failure of a particular SRU. For example, links 16A, 16B, and 16D may indicate that one or more evidential observations have established that a particular test result of the tests that correspond to test nodes 14A, 14B, and 14D correspond to a failure of the SRU that corresponds to the SRU node 12A.

The SRU nodes 12 and test nodes 14 have corresponding probability tables based on the links 16 that are used to calculate a probability of a state of a particular node 12, 14 given the state of other nodes 12, 14 to which the node 12, 14 has a link 16. For example, a probability that the SRU node 12A has failed may be based on the probability of a state of the test nodes 14A, 14B, and 14D. Unfortunately, as the number of links 16 grows between a node and other nodes, the processing associated with determining the probability of a node grows exponentially. Over time, the processing associated with inferring probabilities can take substantial processing time, diminishing the usefulness of the Bayesian network 10.

Links 16 may also be established simply by generating a link 16 based on a technician's past experiences. For example, a technician may believe, based on past experiences, that there is a relationship between the SRU node 12C and the test node 14D, as evidenced by the link 16H. In this example, the only basis of the link 16H may be the technician's belief that such a relationship exists; there may be no evidential observations that support that belief.

Figure 2:
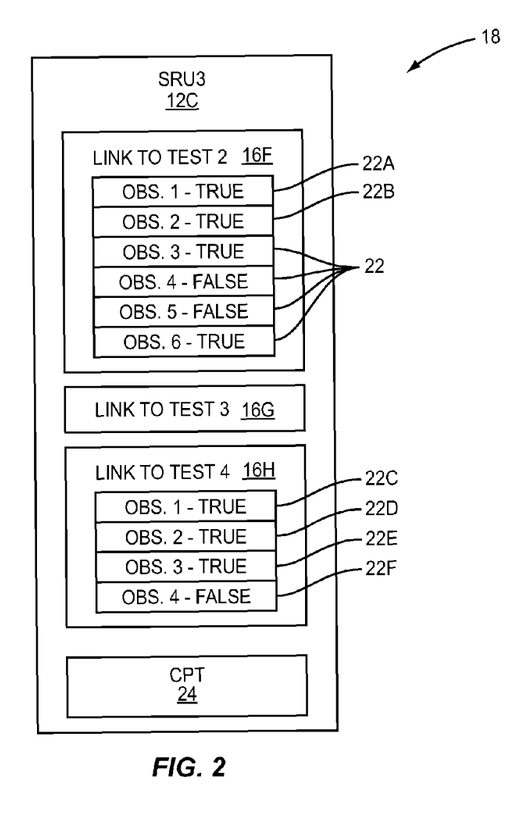
FIG. 2 illustrates an exemplary data structure which may be used for implementing a node illustrated in FIG. 1.

FIG. 2 illustrates an exemplary data structure which may be used for implementing a node 12, 14 in the Bayesian network 10. While FIG. 2 illustrates one mechanism for maintaining the data associated with a node in a Bayesian network, it should be appreciated that such information may be stored in any number of different data structures, and the precise mechanism for maintaining such information may be system or designer dependent. For purposes of illustration, assume that a data structure 18 is used to maintain information associated with the SRU node 12C. The data structure 18 may be stored in a persistent storage device, such as a hard drive, and loaded into a random access memory during operation. The data structure 18 includes links 16F, 16G and 16H, which indicate relationships between the SRU node 12C and the test nodes 14B, 14C and 14D, respectively. Each link 16 may contain zero or more evidential observations 22. Each evidential observation 22 indicates that a dependency was observed and recorded between a state of a test node 14 and the corresponding SRU node 12C.

Referring to the link 16F, the evidential observation 22A indicates that the SRU node 12C was determined to have failed after observing a test result indicating a failure of the test that corresponds to the test node 14B. The evidential observation 22B similarly indicates a second occurrence wherein the SRU node 12C was diagnosed as having failed after observing a test result indicating a failure of the test that corresponds to the test node 14B.

The link 16G contains no corresponding evidential observations 22. This may occur, for example, when the link 16G is established based on an individual's (such as a technician's) belief that there is a relationship between the failure of the test that corresponds to the test node 14C and the SRU corresponding to the SRU node 12C, but there are no evidential observations that confirm this belief.

The link 16H contains four evidential observations 22C-22F indicating a relationship between the SRU corresponding to the SRU node 12C and the test corresponding to the test node 14D. The evidential observations 22C-22F indicate occurrences wherein the test corresponding to the test node 14D failed and the SRU corresponding to the SRU node 12C was faulty. The evidential observation 22F indicates an occurrence wherein the test corresponding to the test node 14D failed and the SRU corresponding to the SRU node 12C was not faulty.

The SRU node 12C also includes a conditional probability table (CPT) 24 that contains the conditional probability that the SRU corresponding to the SRU node 12C is faulty based on the states of the test nodes 14B-14D.

Figure 3:
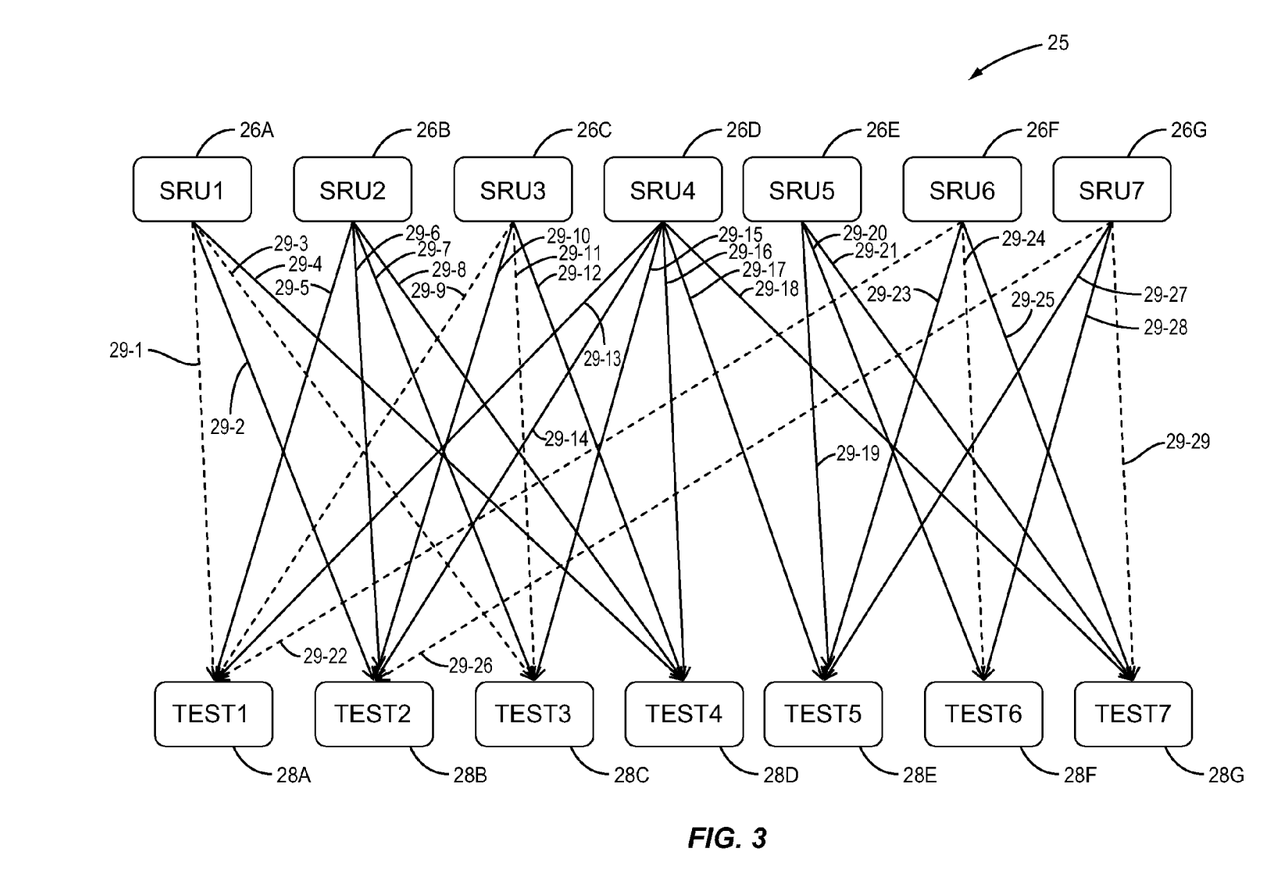
FIG. 3 illustrates another exemplary Bayesian network that models the relationship between components and diagnostic tests, according to another embodiment.
Figure 4:
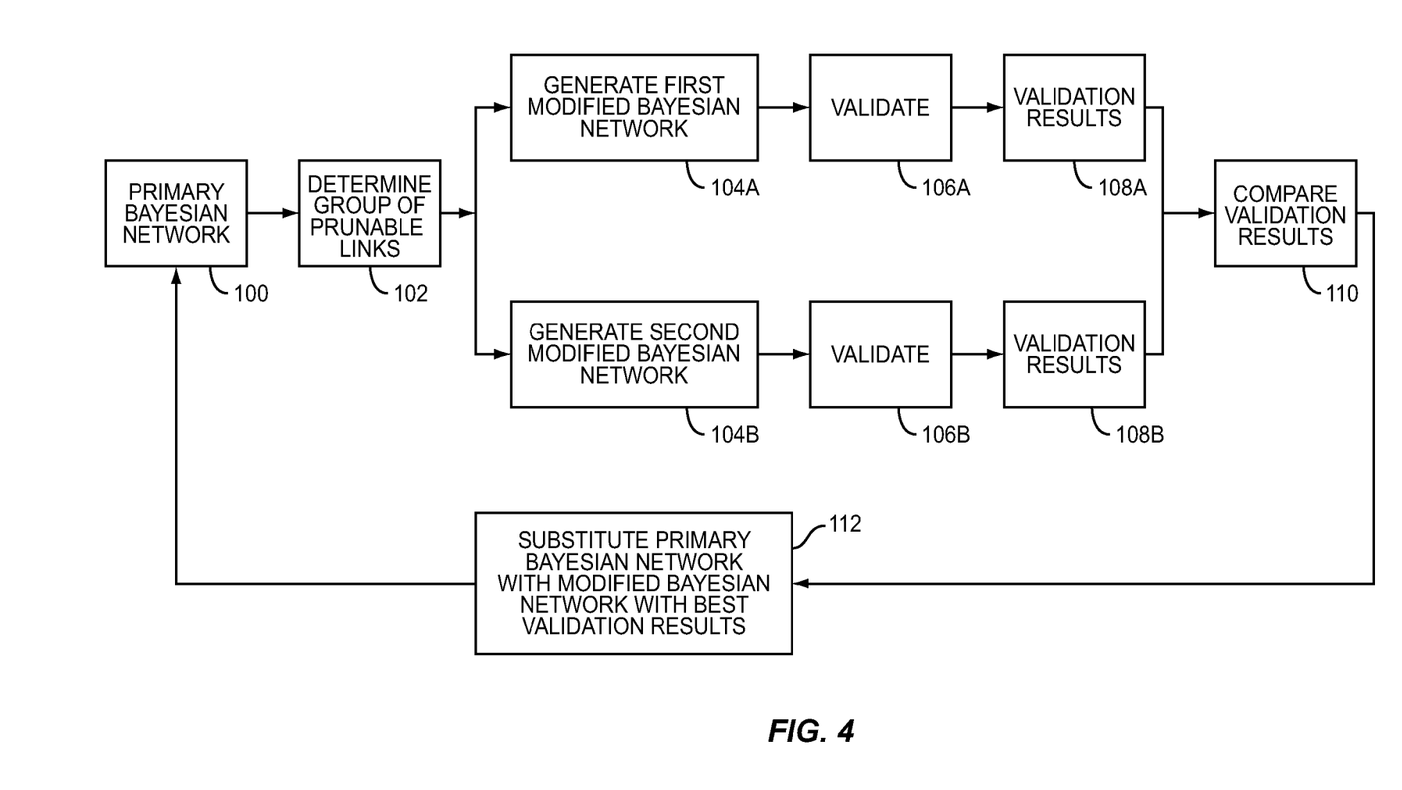
FIG. 4 is a flow diagram illustrating a process for reducing links in a Bayesian network while maintaining inferential accuracy of the Bayesian network.

FIG. 3 illustrates another exemplary Bayesian network 25 that models the relationships between components and diagnostic tests, according to another embodiment. A plurality of SRU nodes 26A-26G are related via links 29-1-29-29 to a plurality of test nodes 28A-28G. For purposes of illustration, the relationships between the SRU nodes 26A-26G and the test nodes 28A-28G in the Bayesian network 25 illustrated in FIG. 3 may differ from those depicted in FIG. 1. FIG. 4 is a flow diagram illustrating a process for reducing links in a Bayesian network while maintaining inferential accuracy of the Bayesian network. FIG. 4 will be discussed in conjunction with FIG. 3. For purposes of distinguishing different Bayesian networks, with regard to FIGS. 3 and 4, the Bayesian network 25 will be referred to as the primary Bayesian network. Initially, a primary Bayesian network 25 is established (step 100). The primary Bayesian network 25 may be established through conventional training mechanisms via the use of a training data set. Such mechanisms are known and will not be described in detail herein, other than to articulate that the process of training the Bayesian network 25 with a training data set in part establishes the links 29 between the SRU nodes 26 and test nodes 28 depicted in FIG. 3 and the evidential observations 22 (FIG. 2) that support such links 29. However, the Bayesian network 25 may also include links 29 that are established based on an individual's belief that a relationship exists between an SRU node 26 and a test node 28, even though the training data set does not establish any evidential observations 22 that support such belief. In addition to the links 29 established via the training process, or via the expertise of a technician, the primary Bayesian network 25 may also have been in operation for a period of time prior to the process described herein with regard to FIG. 4, and thus may include links 29 that have been established based on actual use of the primary Bayesian network 25 while in operation.

The links 29 of the primary Bayesian network 25 are analyzed in order to identify a group of prunable links 29 based on the number of evidential observations 22 associated with the links 29 (step 102). For example, a threshold number of evidential observations 22, such as four (4), may be established, and each link 29 that has four (4) or fewer evidential observations 22 may be identified as a prunable link 29. Referring to FIG. 3, assume that during the analysis of the primary Bayesian network 25, the links 29-1, 29-3, 29-9, 29-11, 29-22, 29-24, 29-26, and 29-29 depicted as dashed lines in FIG. 3 are identified as having fewer than a threshold number of evidential observations 22, and thus make up a group of prunable links 29.

In one embodiment, a number of modified Bayesian networks are generated based on the primary Bayesian network 25 (steps 104A, 104B). While only a first and second modified Bayesian network are illustrated in FIG. 4, any number of modified Bayesian networks may be generated. Each modified Bayesian network is based on the primary Bayesian network 25, but contains only a subset of the group of prunable links 29. For example, each modified Bayesian network may be a copy of the primary Bayesian network 25 except that the modified Bayesian network contains only a subset of the group of prunable links 29, and thus contains fewer links 29 overall than the primary Bayesian network 25. Thus, each modified Bayesian network will provide, at least in some instances, faster inference processing because the conditional probability tables associated with at least some nodes 26, 28 will be based on fewer relationships between the nodes 26, 28.

In one embodiment, a number of the links 29 from the group of prunable links 29 are selected to identify a first subset of prunable links 29, and the first subset of prunable links 29 are not included in the first modified Bayesian network. The particular number of links 29 in the first subset of prunable links 29 may be determined arbitrarily or randomly, or may be predetermined. The first subset of prunable links 29 may also be referred to herein as a first exclusionary subset of prunable links 29, and the remainder of the links 29 in the primary Bayesian network 25 that are not in the first exclusionary subset of prunable links 29 may be referred to as a first inclusionary subset of links 29. Note that the first exclusionary subset of prunable links 29 is a proper subset of all the links 29 in the primary Bayesian network 25.

As an example of the identification of the first subset of prunable links 29, assume the number four (4) is selected, and the links 29-1, 29-3, 29-9, and 29-22 are selected to identify the first subset of prunable links 29. In such example, the first modified Bayesian network is similar to the primary Bayesian network 25, except that the first modified Bayesian network does not have the links 29-1, 29-3, 29-9, and 29-22. In other words, the first modified Bayesian network includes the inclusionary subset of links 29 but not the first exclusionary subset of links 29. A second subset of four (4) prunable links 29 may then be selected for the second modified Bayesian network. The second subset of prunable links 29 may be referred to herein as a second exclusionary subset of prunable links 29. Note that the second exclusionary subset of prunable links 29 is a proper subset of all the links 29 in the primary Bayesian network 25. The remainder of the links 29 in the primary Bayesian network 25 that are not in the second exclusionary subset of prunable links 29 may be referred to as a second inclusionary subset of links 29. For example, assume that the links 29-1, 29-22, 29-26, and 29-29 are selected as the second subset of prunable links 29. In such example, the second modified Bayesian network is similar to the primary Bayesian network 25, except that the second modified Bayesian network does not have the links 29-1, 29-22, 29-26, and 29-29. In other words, the second modified Bayesian network includes the second inclusionary subset of links 29 but not the second exclusionary subset of links 29. In this manner, a number of modified Bayesian networks may be generated, each of which have four (4) fewer links than the primary Bayesian network 25, wherein each of the modified Bayesian networks are different from one another based on the particular subset of four (4) prunable links 29 pruned from the corresponding modified Bayesian network.

In another embodiment, a first arbitrary, or random, number of links 29 from the group of prunable links 29 is selected to identify the first subset of prunable links 29, and a second arbitrary, or random, number of links 29 from the group of prunable links 29 is selected to identify the second subset of prunable links 29. In such example, the first modified Bayesian network has a different number of links 29 than the second modified Bayesian network because a different number of prunable links 29 was pruned from the first modified Bayesian network than from the second modified Bayesian network.

The first modified Bayesian network and the second modified Bayesian network are validated with a validation data set (steps 106A, 106B). The validation data set is preferably the same data set for both the first modified Bayesian network and the second modified Bayesian network. For example, the validation data set may comprise a number of diagnostic test results that have proven over time to correspond to the failure of certain SRUs. The validation data set may be input into the first and second modified Bayesian networks to determine how accurately the first and second modified Bayesian networks predict the failure of such SRUs. In one embodiment, the validation data set may be generated based on the results of known data over a previous period of time, such as the previous day. For example, technicians may know that over the course of the past 24 hours, certain SRUs were determined to be defective, and may also know the results of the diagnostic tests run to aid in locating the defective SRU. The diagnostic test results may be input into the first and second modified Bayesian networks to generate validation results from the first and second modified Bayesian networks which identify the probabilities that particular SRUs are defective based on the input diagnostic test results (steps 108A, 108B). The validation results are compared to one another to determine whether the first modified Bayesian network or the second modified Bayesian network generated the best validation results (step 110). For example, the Bayesian network which best predicts the actual defective SRUs based on the diagnostic test results may be determined to have the best validation results. The modified Bayesian network with the best validation results is then used in place of the primary Bayesian network 25 (step 112), resulting in a new primary Bayesian network 25 with fewer links 29.

In one embodiment, if the validation results are comparable, the modified Bayesian network having the fewest number of links 29 is used in place of the primary Bayesian network 25. In another embodiment, the primary Bayesian network 25 is also validated using the validation data set, and if the validation results of the first modified Bayesian network and the second modified Bayesian network are not sufficiently comparable or superior to the validation results of the primary Bayesian network 25, the primary Bayesian network 25 is not replaced with either the first modified Bayesian network or the second modified Bayesian network. In such circumstances, additional modified Bayesian networks may be generated based on different subsets of prunable links 29, until the validation results of a modified Bayesian network are comparable or superior to the validation results of the primary Bayesian network 25. The process described herein with respect to FIG. 4 may be performed at any desired interval, such as daily, weekly, monthly, or the like.

Figure 5:
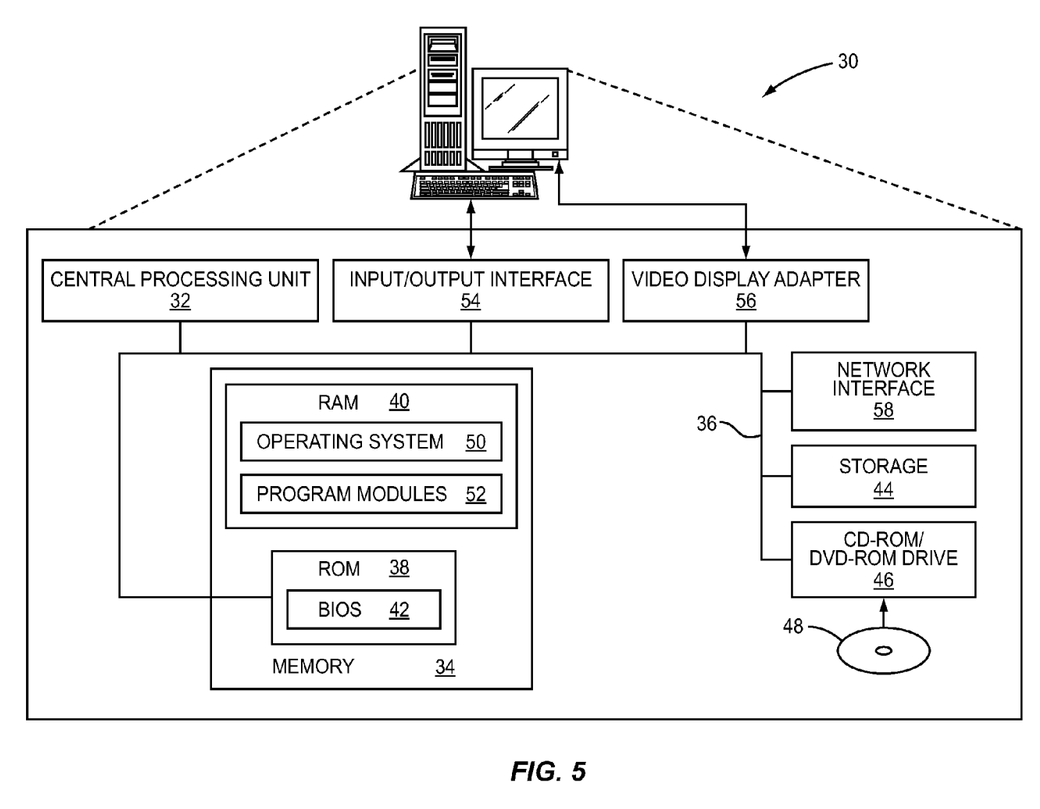
FIG. 5 illustrates an exemplary processing device which may be used to implement a Bayesian network according to one embodiment.

The Bayesian network 25 is typically implemented on one or more processing devices, and may be implemented in any conventional or proprietary Bayesian network programming package. FIG. 5 illustrates an exemplary processing device 30 which may be used to implement the Bayesian network 25 according to one embodiment. The processing device 30 may comprise, for example, a computer, such as a laptop computer, a workstation, a server, or the like. The processing device 30 may include a central processing unit 32, a system memory 34, and a system bus 36. The system bus 36 provides an interface for system components including, but not limited to, the system memory 34 and the central processing unit 32. The central processing unit 32 can be any of various commercially available or proprietary processors. Dual microprocessors and other multi-processor architectures may also be employed as the central processing unit 32.

The system bus 36 can be any of several types of bus structures that may further interconnect to a memory bus (with or without a memory controller), a peripheral bus, and/or a local bus using any of a variety of commercially available bus architectures. The system memory 34 can include non-volatile memory 38 (e.g., read only memory (ROM), erasable programmable read only memory (EPROM), electrically erasable programmable read only memory (EEPROM), etc.) and/or volatile memory 40 (e.g., random access memory (RAM)). A basic input/output system (BIOS) 42 can be stored in the non-volatile memory 38, and can include the basic routines that help to transfer information between elements within the processing device 30. The volatile memory 40 can also include high-speed RAM such as static RAM for caching data.

The processing device 30 may further include a storage 44, which may comprise, for example, an internal hard disk drive (HDD) (e.g., enhanced integrated drive electronics (EIDE) or serial advanced technology attachment (SATA)) for storage, flash memory, or the like. All or part of the Bayesian network 25, for example, may be stored in storage 44. The processing device 30 may further include an optical disk drive 46 (e.g., for reading a compact disc (CD), digital video disc (DVD) or other optical media 48). The drives and associated computer-readable and computer-usable media provide non-volatile storage of data, data structures, computer-executable instructions, and so forth. For the processing device 30, the drives and media accommodate the storage of any data in a suitable digital format. Although the description of computer-readable media above refers to a hard disk drive (HDD) and optical media such as a CD or DVD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed embodiments.

A number of program modules can be stored in the storage 44 and volatile memory 40, including an operating system 50 and one or more program modules 52, which implement the functionality described herein, including, for example, functionality for determining groups of prunable links 29, generating modified Bayesian networks, validation of Bayesian networks, and the like. It is to be appreciated that the embodiments can be implemented with various commercially available operating systems 50 or combinations of operating systems 50. All or a portion of the embodiments may be implemented as a computer program product, such as a computer-usable or computer-readable medium having a computer-readable program code embodied therein. The computer-readable program code can include software instructions for implementing the functionality of the embodiments described herein. The central processing unit 32, in conjunction with the program modules 52 in the volatile memory 40, may serve as a control system for the processing device 30 that is configured to, or adapted to, implement the functionality described herein.

A user may be able to enter commands and information into the processing device 30 through one or more wired or wireless input devices, for example, a keyboard and a pointing device, such as a mouse (not illustrated), or via a display where the display is a touch screen. Other input devices (not illustrated) may include a microphone, an infrared (IR) remote control, a joystick, a game pad, a stylus pen, or the like. These and other input devices are often connected to the central processing unit 32 through an input/output interface 54 that is coupled to the system bus 36 but can be connected by other interfaces such as a parallel port, an IEEE 1394 serial port, a game port, a universal serial bus (USB) port, an IR interface, etc.

The processing device 30 may drive a separate or integral display device, which may also be connected to the system bus 36 via an interface, such as a video display adapter 56. The processing device 30 may communicate with a network via a network interface 58.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the embodiments is provided to enable any person skilled in the art to make or use the embodiments. Various modifications to the embodiments will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A computer-implemented method for reducing a number of links in a Bayesian network, the method comprising:
    generating, by a computer, a first modified Bayesian network based on a primary Bayesian network which has a plurality of links, wherein the first modified Bayesian network does not include a first subset of the plurality of links;
    generating, by the computer, a second modified Bayesian network based on the primary Bayesian network wherein the second modified Bayesian network does not include a second subset of the plurality of links;
    validating the first modified Bayesian network and the second modified Bayesian network using a data set to generate a first validation result and a second validation result, respectively; and
    substituting the primary Bayesian network with the first modified Bayesian network or the second modified Bayesian network based on the first validation result and the second validation result.

2. The computer-implemented method of claim 1, further comprising identifying a group of prunable links of the plurality of links based on a number of evidential observations for each prunable link, wherein the first subset of the plurality of links is a first subset of the group of prunable links, and the second subset of the plurality of links is a second subset of the group of prunable links.

3. The computer-implemented method of claim 1, wherein the number of links in the first subset of the plurality of links is the same as the number of links in the second subset of the plurality of links, and the first subset of the plurality of links is different from the second subset of the plurality of links.

4. The computer-implemented method of claim 1, wherein the number of links in the first subset of the plurality of links is different from the number of links in the second subset of the plurality of links.

5. The computer-implemented method of claim 1, further comprising validating the primary Bayesian network using the data set to determine a Bayesian network validation result, and wherein substituting the primary Bayesian network with either the first modified Bayesian network or the second modified Bayesian network based on the first validation result and the second validation result further comprises substituting the primary Bayesian network with either the first modified Bayesian network or the second modified Bayesian network based on the first validation result, the second validation result, and the Bayesian network validation result.

6. The computer-implemented method of claim 1, further comprising substituting the primary Bayesian network with the first modified Bayesian network or the second modified Bayesian network based on a number of links in the first modified Bayesian network and a number of links in the second modified Bayesian network.

7. The computer-implemented method of claim 1, wherein the primary Bayesian network further comprises a plurality of component nodes and a plurality of test nodes, and wherein each of the plurality of component nodes corresponds to a component, and each of the plurality of test nodes corresponds to a test process.

8. The computer-implemented method of claim 1, wherein the method is performed on a processing device.

9. The computer-implemented method of claim 1, wherein the method is performed via computer-readable program code stored on a non-transitory computer-usable medium.

10. A computer-implemented method for reducing a number of links in a Bayesian network, the method comprising:
    generating, by a computer, a first modified Bayesian network comprising a first plurality of links based on a primary Bayesian network, wherein a first inclusionary subset of links and a first exclusionary subset of links are identified from a plurality of links in the primary Bayesian network, and wherein the first plurality of links of the first modified Bayesian network comprises only the first inclusionary subset of links;
    generating, by the computer, a second modified Bayesian network comprising a second plurality of links based on the primary Bayesian network, wherein a second inclusionary subset of links and a second exclusionary subset of links are identified from the plurality of links in the primary Bayesian network, and wherein the second plurality of links of the second modified Bayesian network comprises only the second inclusionary subset of links;
    validating the first modified Bayesian network and the second modified Bayesian network using a data set to generate validation results; and
    substituting the primary Bayesian network with the first modified Bayesian network or the second modified Bayesian network based on the validation results.

11. The computer-implemented method of claim 10, further comprising identifying the first exclusionary subset of links based on a number of evidential observations associated with each link in the plurality of links in the primary Bayesian network.

12. The computer-implemented method of claim 10, wherein the number of links in the first exclusionary subset of links is the same as the number of links in the second exclusionary subset of links, and the first exclusionary subset of links is different from the second exclusionary subset of links.

13. The computer-implemented method of claim 10, wherein the number of links in the first exclusionary subset of links is different from the number of links in the second exclusionary subset of links.

14. The computer-implemented method of claim 10, further comprising substituting the primary Bayesian network with the first modified Bayesian network or the second modified Bayesian network based on a number of links in the first modified Bayesian network and a number of links in the second modified Bayesian network.

15. The computer-implemented method of claim 10, wherein the primary Bayesian network further comprises a plurality of component nodes and a plurality of test nodes, and wherein each of the plurality of component nodes corresponds to a component, and each of the plurality of test nodes corresponds to a test process.

16. A computer-implemented method for reducing a number of links in a Bayesian network, the method comprising:
 generating, by a computer, a first modified Bayesian network based on a primary Bayesian network, wherein the first modified Bayesian network comprises a first proper subset of a plurality of links in the primary Bayesian network based on evidential observations associated with the plurality of links in the primary Bayesian network;
 generating, by the computer, a second modified Bayesian network based on the primary Bayesian network, wherein the second modified Bayesian network contains a second proper subset of the plurality of links in the primary Bayesian network based on the evidential observations associated with the plurality of links in the primary Bayesian network;
 validating the first modified Bayesian network and the second modified Bayesian network using a data set to generate validation results; and
 substituting the primary Bayesian network with the first modified Bayesian network or the second modified Bayesian network based on the validation results.

17. The computer-implemented method of claim 16, wherein the number of links in the first proper subset of links is the same as the number of links in the second proper subset of links, and the first proper subset of links is different from the second proper subset of links.

18. The computer-implemented method of claim 16, wherein the number of links in the first proper subset of links is different from the number of links in the second proper subset of links.

19. The computer-implemented method of claim 16, further comprising substituting the primary Bayesian network with the first modified Bayesian network or the second modified Bayesian network based on a number of links in the first modified Bayesian network and a number of links in the second modified Bayesian network.

20. The computer-implemented method of claim 16, wherein the primary Bayesian network further comprises a plurality of component nodes and a plurality of test nodes, and wherein each of the plurality of component nodes corresponds to a component, and each of the plurality of test nodes corresponds to a test process.

* * * * *